Oct. 24, 1950          H. W. KUGLER          2,526,956
FLUID ACTUATED RECIPROCATING TOOL
Filed Aug. 27, 1946          2 Sheets-Sheet 1
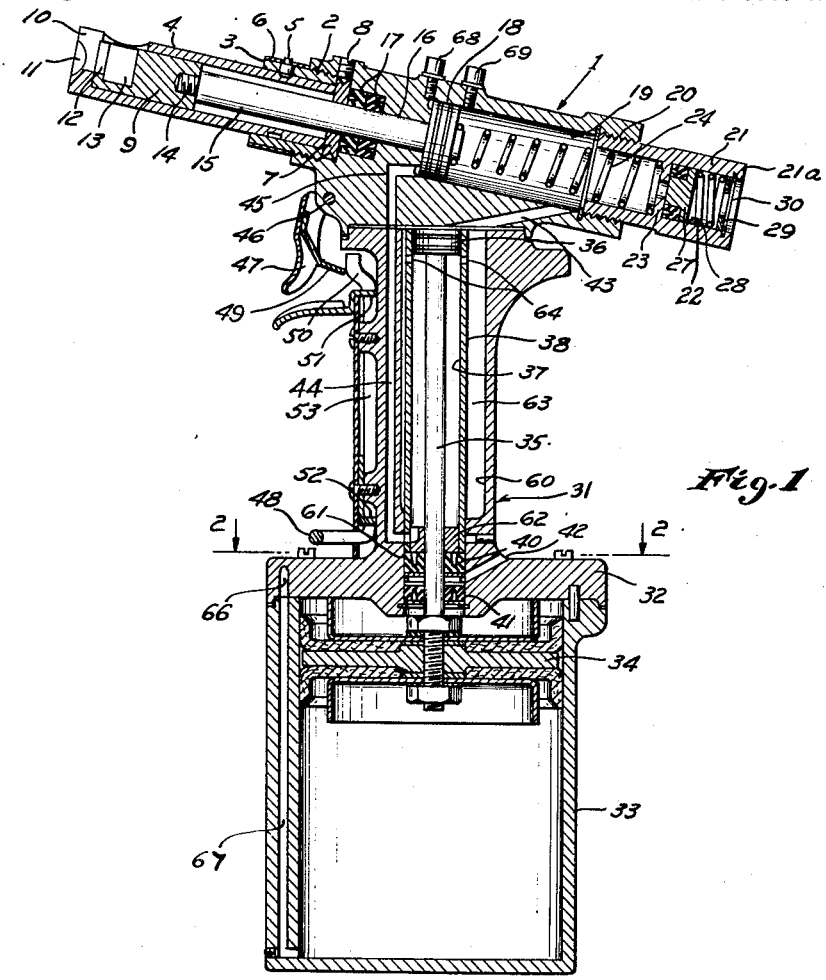
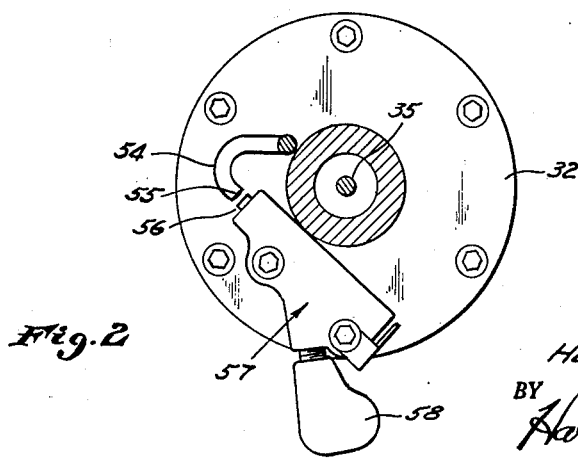
INVENTOR.
HERBERT W. KUGLER
BY
Harold W. Mattingly
ATTORNEY Oct. 24, 1950 — H. W. KUGLER — 2,526,956
FLUID ACTUATED RECIPROCATING TOOL
Filed Aug. 27, 1946 — 2 Sheets-Sheet 2

INVENTOR.
HERBERT W. KUGLER
BY Harold W. Mattingly
ATTORNEY

Patented Oct. 24, 1950

2,526,956

UNITED STATES PATENT OFFICE 2,526,956

FLUID ACTUATED RECIPROCATING TOOL

Herbert W. Kugler, Los Angeles, Calif., assignor to Cherry Rivet Company, Los Angeles, Calif., a corporation of California Application August 27, 1946, Serial No. 693,283

7 Claims. (Cl. 60—54.5)

My invention relates to power operated tools and has particular reference to a power tool for exerting large pulling or pinching forces upon objects for the purpose of severing such objects while the forces are being applied thereto, such as pulling tools for the setting of blind rivets and tools employed for cutting or breaking bolt heads.

This application is a continuation in part of my earlier application, Serial No. 632,626, filed December 4, 1945, and which has since become abandoned.

In the manufacture of many articles it is desirable to connect two or more work sheets or work pieces together by means of rivets under circumstances in which it is impossible or inconvenient to obtain access to opposite ends of the rivets for the performance of ordinary rivet upsetting operations. To accomplish the desired result it has grown to be the practice to employ blind rivets of the type in which a rivet body is provided with a longitudinal bore through which extends a mandrel having an enlarged head disposed adjacent the free end of the rivet body shank. The mandrel is provided with a stem portion which extends through the rivet and projects beyond the head of the rivet body to be gripped by a pulling tool. After the rivet has been inserted from one side of the assembled work pieces, a pulling force may be exerted by the pulling tool from that same side of the assembled work pieces, pulling the mandrel head into the rivet shank, upsetting the free end thereof and securing the rivet in the work pieces.

In the usual blind rivet setting operations, a sufficient force is exerted upon the mandrel stem not only to pull the upsetting head to achieve the performance of the upsetting operation but also an additional pull is exerted sufficient to break off the stem.

Heretofore the pulling tools employed for setting the blind rivets have either been hand-powered or have been operated by relatively large pneumatic cylinder and piston constructions by which air under pressure is employed to produce the necessary pulling forces. In order to provide the necessary power to insure the proper upsetting of the rivet body shank and the breaking of the mandrel stem, the pneumatic operator must either be supplied with air under relatively great pressure in pounds per square inch or the piston and cylinder mechanisms must be relatively large if the air pressures used are comparatively low, the result being that the size and weight of the tool is such as to render the tool cumbersome as a hand tool.

In addition, it has been necessary to provide special cushioning devices adapted to absorb a shock of the sudden release of strain when the mandrel stem breaks, such cushioning devices being required not only to prevent undesirable shocks to the hand of the operator but also to prevent the rapid destruction of the pulling tool.

It is therefore an object of my invention to provide a hand tool for applying a force that may be suddenly relieved, in which the pulling forces during the working period may be applied smoothly and in which there is no substantial shock imparted to the tool upon the severance of the mandrel stem.

Another object of my invention is to provide a tool of the character described wherein a closed hydraulic piston and cylinder system is employed for multiplying power from a relatively low pressure source of power to impart great pulling forces upon the rivet engaging members of the tool.

Another object of my invention is to provide a tool of the character described, in which the closed hydraulic system includes a pair of force multiplying pistons and cylinders and in which any inadvertent leakage of fluid past the pistons is automatically restored to the opposite sides of the piston upon each operating cycle of the tool.

Other objects and advantages of my invention will be apparent from a study of the following specifications, read in connection with the accompanying drawings, wherein:

Fig. 1 is a vertical sectional view illustrating the details of construction of a blind rivet applicator constructed in accordance with the preferred embodiment of my invention;

Fig. 2 is a cross sectional view taken substantially along line 2—2 of Fig. 1;

Figure 3:
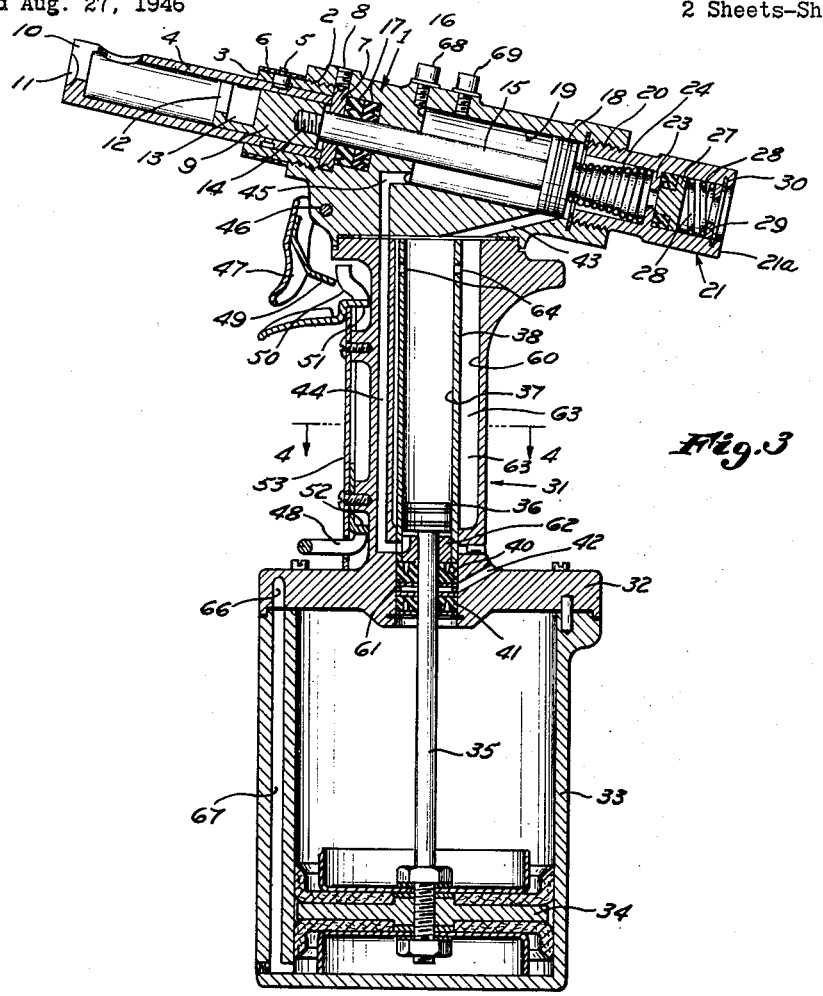
Fig. 3 is a longitudinal sectional view similar to Fig. 1 but showing the relative dispositions of the movable parts at the end of a rivet stem pulling stroke.

Referring to the drawings, I have illustrated in Fig. 1 the preferred embodiment of my invention as comprising an upper housing member 1, to the forward end of which is secured, as by means of threads 2, an adaptor sleeve 3 for receiving a rivet engaging sleeve 4. The rivet engaging sleeve 4 is disposed within the bore of the adaptor sleeve 3 and is held therein by means of a detent member 5 engaging a suitable recess formed in the sleeve 4, the detent member 5 being urged inwardly as by means of a flat strip spring 6. Endwise thrust exerted on the rivet engaging sleeve 4 is taken by a thrust washer 7 which is secured within the housing 1 by means of the adaptor sleeve 3 and a set screw 8.

Within the sleeve 4 there is slidably mounted a draw bolt 9. The sleeve 4 is slotted as shown at 10 and is provided with a recessed front face 11 permitting the sleeve 4 to be placed against the head of the tubular body of a blind rivet and permitting the stem to be received within the slot 10. The rivet stem passes also through a slot 12 formed in the end of the draw bolt 9 and a pulling head formed on the outer end of the stem is received within an enlarged pocket 13 formed in the end of the draw bolt. Reference to my Patent No. 2,384,037, issued September 4, 1945, will provide additional details of the construction of these well known means for engaging a blind rivet applicator with the stem and body of the blind rivet.

The draw bolt 9 is attached as by means of threads 14 to a piston rod 15 which passes through a piston rod receiving bore 16 formed in the body 1. A fluid seal is established around the piston rod 15 by means of sealing members 17 placed in a suitable recess formed in the body member 1 immediately aft of the thrust washer 7. To the inner end of the piston rod 15 there is secured a piston 18 which is arranged to reciprocate within a hydraulic cylinder bore 19 formed in the body member 1.

The aft end of the bore 19 is preferably threaded as indicated at 20 to receive a compensating device assembly 21. The compensating device 21 is shown in detail in Fig. 5 as a barrel 21a having an internal bore 22 formed therein. The bore 22 is terminated by a radially extending partition 23 which serves as a seat for a restoring compression spring 24 interposed between the piston 18 and the partition 23. A small bore 25 is provided in the partition 23 to fluidly interconnect the cylinder bore 19 with the compensating cylinder bore 22 formed in the outer end of the barrel 21a.

Within the compensating cylinder bore 22 there is mounted for reciprocation a compensating piston 27. As is shown in Fig. 3, the piston 27 is normally urged to the left by means of a compression spring 28 interposed between the piston 27 and a thrust washer 29, the thrust washer 29 being retained within the bore 22 as by means of a snap ring 30 placed near the outer end of that bore.

The body member 1 is secured to a handle member 31 that may be manually grasped, the lower end of which is flanged outwardly as shown at 32 to form an upper air closure for a pneumatic cylinder 33. Within the cylinder 33 there is mounted a double acting air piston 34 which is secured to a vertically extending piston rod 35. The piston rod 35 is secured to a driving hydraulic piston 36 mounted for reciprocation within a cylinder bore 37 defined by a sleeve member 38. The sleeve 38 may be disposed eccentrically within a reservoir bore 60 formed within the handle member 31, and may be secured therein by a press fit or otherwise of the sleeve 38 within a bore 61 disposed between the reservoir bore 60 and the cylinder 33. An annular plug 62 may be disposed within the lower end of the sleeve 38 to aid in maintaining the press fit. A reservoir chamber 63 is defined by the outer surface of the sleeve 38 and the interior of the reservoir bore 60.

Between the piston 34 and the lower end of the annular plug 62, the piston rod 35 is surrounded by a pair of sealing members 40 and 41. These sealing members are preferably spaced from each other as shown and the space between the sealing members is communicated with the atmosphere as by means of a port 42 through the flanged cap member 32.

The upper end of the cylinder bore 37 and the upper end of the reservoir chamber 63 are communicated with the aft end of the cylinder bore 19 as by means of a passageway 43 while the lower end of the cylinder bore 37 is communicated with the forward end of the cylinder bore 19 by passageways 44 and 45. It will also be noted that the end of the sleeve 38 may be spaced from the body member 1 so that there may be communication of the interior of the sleeve 38 with the reservoir 63, or the end of passage 43 may be broad enough to intercommunicate the two. Also it will be noted that a plurality of passages 64 may communicate the interior of the sleeve 38 with the reservoir 63, and that these passages may be located at a distance from the upper end of the sleeve 38 approximately equal to the thickness of the hydraulic piston 36. The reservoir is preferably maintained filled with liquid so as to insure that all of the space between the pistons 36 and 18 will be completely filled at all times, fluid which leaks past the piston 18 being returned to the reservoir to maintain the reservoir full and to insure that upon the exposure of the passage 64, any lack of fluid below the piston 36 will be replaced.

To the body member 1 there is secured as by means of a pivot pin 46 a trigger member 47, pivotal movement of which will be translated into pivotal movement of a rock bar 48 by means of a tailpiece 49 secured to the trigger 47 and engaging a crank arm portion 50 of the rock bar 48. The rock bar is journaled for pivotal movement as described in journal members 51 and 52 secured to a handle plate 53 mounted upon the handle member 31.

The lower end of the rock bar is preferably curved as shown at 54 in Fig. 2 to dispose an end 55 thereof in engagement with an actuating plunger 56 of a four-way valve mechanism indicated generally at 57. The valve mechanism is provided with a connection member 58 to permit a supply of air under pressure to be connected to the inlet side of the valve 57.

The valve 57 may be of any suitable construction and arranged in its normal position to connect a supply through passageways 66 and 67 of high pressure air with that portion of the pneumatic cylinder 33 which is disposed below the piston 34 and arranged when the plunger 56 is depressed to connect (through a passageway not shown) the high pressure air to the portion of the cylinder above the piston 34 and to provide an exhaust connection from the portion of the cylinder below the piston. It will thus be seen that whenever the trigger 47 is depressed, the piston 34 will be caused to descend to the lower part of the cylinder 33 as shown in Fig. 3 and that upon release of the trigger 47 the air connections to the pneumatic cylinder 33 will be reversed to drive the piston to the upper position shown in Fig. 1.

This motion of the piston is transmitted to the driving hydraulic piston 36 by means of the piston rod 35. The hydraulic system comprising the cylinder bores 19 and 37 and the passageways 43, 44 and 45 are understood to be completely filled with a suitable hydraulic liquid which is substantially incompressible. This liquid may be supplied to the completely assembled tool by removing two caps 68 and 69 in the body member 1 and pouring liquid in one of the holes, preferably that of cap 68, allowing air to escape out of the other. The hydraulic piston 36 may be in its upper position, as shown in Fig. 1, for this filling operation.

It will also be noted with reference to the drawings that the upper and lower limits of the stroke of the hydraulic piston 36 is determined by the abutment of the pneumatic piston 34 at the two ends of its cylinder 33. As shown in Fig. 1, the pneumatic piston 34 is at the upper end of the cylinder 33 and the piston 36 connected to the upper end of piston rod 35 is spaced a short distance away from the body member 1. Also with reference to Fig. 3, it will be noted that the pneumatic piston 34 is seated at the bottom of the cylinder 33 and that the hydraulic piston 36 is spaced a short distance above the plug 62 within the bore 37. The amount of liquid displaced within the bore 37 by the downward movement of piston 36 from the position shown in Fig. 3 displaces the piston 18 just short of the end of the bore 19, as shown in Fig. 3. It will therefore be appreciated that the piston 18 stops its power stroke to the right because of the cessation of the fluid flow into the bore 19 because of the abutment of the piston 34 with the end of the cylinder 33. Under these conditions the stopping of the piston 18 is cushioned and therefore the shock that might otherwise result from a sudden stopping of the movable parts in the body member 1 is eliminated.

It will be seen that when the air piston 34 is caused to descend by operating the trigger 47, the driving hydraulic piston 36 will also descend within the cylinder bore 37. Fluid beneath the piston 36 so displaced will be conducted through the passages 44 and 45 to the front side of the piston 18 and thus move the piston 18 rearwardly within the cylinder bore 19. The fluid displaced from the aft portion of the cylinder bore 19 by this rearward movement of the piston 18 will be returned to the upper portion of the cylinder bore 37 through the passage 43. Furthermore, movement of the piston 18 will be transmitted to the draw bolt 9 through the piston rod 15 and if the draw bolt 9 is engaged with the mandrel stem of a blind rivet, the rivet engaging sleeve 4 will be forced against the head of the rivet so that its recessed face 11 will cap the rivet head and the draw bolt 9 will draw the mandrel stem into the rivet body.

Additional movement of the piston 18 to the right finally results in breaking the stem of the rivet mandrel, releasing forces on the order of 500 to 2000 pounds. This sudden release of forces that the piston 18 was overcoming does not result in any rapid movement, however, due to the fact that the hydraulic fluid used in the bores 37 and 19 is substantially incompressible.

Furthermore, there is fluid to the right of the piston 18 at all times and the inertia of this fluid acts to cushion the movement of the piston 18 when the mandrel stem is finally ruptured. These inertia forces are aided by metering action of the fluid passing through the passage 43 to the top of the bore 37 and to the reservoir 63. Furthermore, the continued movement to the right of the piston 18 near the end of its stroke causes the piston 18 to close off the passage 43 gradually, getting a greater restriction of orifice size as the piston 18 progresses to the right. This metering action takes place over a relatively long distance because the angle of the passage 43 with respect to the bore 19 results in an elongated opening into the bore 19.

It will be realized that during the pressure stroke of the piston 36, that is, during downward movement of the piston 36 in the bore 37, there may be a tendency for this high pressure hydraulic fluid to leak past the piston 36. The same pressure of hydraulic fluid is also exerted upon the piston 18 and there may be a tendency for liquid to leak past this piston also. If this leakage were not corrected, there might result a lack of synchronization between the movement of the piston 36 and the piston 18. Accordingly, therefore, I provide automatic indexing action for synchronizing the two pistons at the end of every operation of the complete tool.

Figure 5:
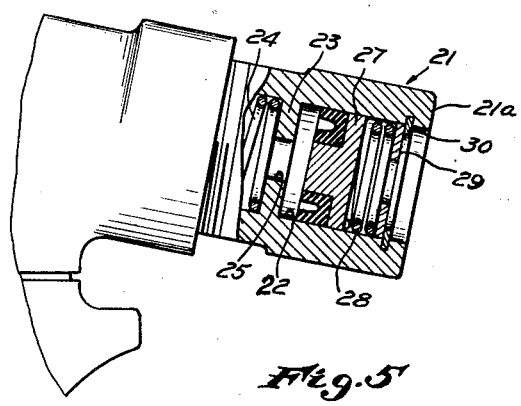
Fig. 5 is an enlarged fragmentary sectional view of the compensator portion of the apparatus.
Figure 4:
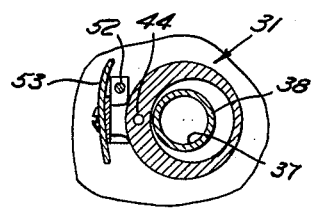
Fig. 4 is a sectional view of the handle construction taken along the line 4—4 of Fig. 3.

Assuming now that fluid has leaked past the piston 36 or the piston 18, there will be an excess of fluid to the right of piston 18 and above piston 36 and in the reservoir 63. Accordingly, therefore, as pneumatic pressure is applied to the bottom of the piston 34, urging the piston 36 upwardly, the piston 18 will be forced to the left until it engages the end of the bore 19. If there is a deficiency of fluid in the system below the piston 36, cavitation will occur as the piston 36 moves upwardly. The excess of liquid trapped on the other side of the system is provided with space in which to flow by means of the compensating spring-biased piston 27. This excess of fluid accordingly will depress the piston 27 to the right as shown in Fig. 5. As the piston 36 reaches the upper limit of its stroke, however, it will pass the apertures 64 in the sleeve 38 until it reaches the position shown in Fig. 1. The spring 28 which urges the piston 27 to the left applies a pressure to the right-hand half of the hydraulic system, forcing liquid through the ports 64 to relieve the cavitation below the piston 36. This flow of fluid into the bore 37 re-indexes or resynchronizes the pistons 36 and 18 inasmuch as both are at the extreme limits of their stroke. Air is entirely excluded from the hydraulic system because of the packings 17, 40 and 41 as well as the packing about the piston 27. Therefore, no air can enter the system to create air pockets that would add an elastic element to the hydraulic system.

From the foregoing description it will be apparent that my mechanism provides an auxiliary expansible chamber for temporarily receiving liquid when the two hydraulic pistons are out of synchronization and that as soon as the complete cycle of piston operation is completed the expansible chamber restores liquid to the proper portion of the hydraulic system to re-synchronize the two. The provision of an expansible chamber as part of the indexing mechanism permits the use of a solid actuating piston 18, which can be satisfactorily cushioned by the trapping of fluid behind it.

When the draw bolt 9 is returned to its starting position to the left, as shown in Fig. 1, the broken off stem of the rivet mandrel may be removed therefrom and a fresh rivet assembly inserted for a second use. As noted previously, the operator grasps the entire tool manually by grasping the handle portion 31 and with one finger actuates the finger 50 which rotates the rock bar 48, actuating the valve 57 which alternatively connects one end of the cylinder 33 to pressure and the other to exhaust for operating the piston 34.

Preferably the piston 36 is made considerably smaller in diameter than the piston 18 so that the hydraulic system described comprises a force multiplying system operating to apply to the draw bolt 9 a substantially greater pulling force than that exerted by the piston 34 on the piston rod 35. By this means I am enabled to use the device on relatively low pressure air without requiring an excessively large diameter air piston and at the same time avoiding the use of mechanical linkages between the air piston and the draw bolt 9.

Although I have designed the power tool of my invention for use on setting blind rivets, it is also well suited for any operation in which pressure is suddenly relieved. The same benefits of freedom from shock to the operator and prolongation of the life of the tool are realized in such applications; for example, the draw bolt 9 and the sleeve 4 may be replaced with a traction bar and scissors, respectively, wherein the reciprocatory element, the traction bar, is secured to the piston rod 15. This bolt cutting mechanism may be of any suitable type; for example, such as that disclosed in the patent to Dehn No. 770,270. After part way cutting through a bolt, the shear forces are relieved, producing a situation similar to the breaking of a stem of a blind rivet.

Various other uses and modifications of my invention may be employed without departing from the true spirit and scope thereof and accordingly I do not limit myself to the specific embodiment illustrated or otherwise except by the terms of the following claims.

I claim:

1. In an applicator for setting blind rivets including a sleeve for engaging the body of the rivet and a draw bolt slidable in said sleeve for engaging and drawing the mandrel stem of the rivet, the combination of a pneumatic piston and cylinder assembly; a hydraulic force multiplying means for drivable connection between said draw bolt and said piston, said hydraulic means comprising a closed system completely filled with an incompressible fluid; and a variable volume expansible chamber connected to said system to compensate for out-of-phase relationship between different parts of said system.

2. In an applicator for setting blind rivets including a sleeve for engaging the body of the rivet and a draw bolt slidabe in said sleeve for engaging and drawing the mandrel stem of the rivet, the combination of a pneumatic piston and cylinder assembly; a hydraulic cylinder; a driven piston in said cylinder; means for connecting said driven piston to said draw bolt; another hydraulic cylinder; a driving piston in said other cylinder; means connecting said driving piston to said pneumatic piston; fluid passages connecting corresponding ends of said hydraulic cylinders to define a closed system, said hydraulic cylinders and passages being completely filled with an incompressible fluid; and a variable volume reservoir connected to said system to compensate for volumetric differences due to the differential displacements of said pistons.

3. In an applicator for setting blind rivets including a sleeve for engaging the body of the rivet and a draw bolt slidable in said sleeve for engaging and drawing the mandrel stem of the rivet, the combination of a pneumatic piston and cylinder assembly; a hydraulic cylinder; a driven piston in said cylinder; means for connecting said driven piston to said draw bolt; another hydraulic cylinder; a driving piston in said other cylinder; means connecting said driving piston to said pneumatic piston; fluid passages connecting corresponding ends of said hydraulic cylinders to define a closed system, said hydraulic cylinders and passages being completely filled with an incompressible fluid; a compensating cylinder connected to said system; a compensating piston in said compensating cylinder; and spring means normally urging said compensating piston in a direction to restore fluid to said system.

4. In an applicator for setting blind rivets including a sleeve for engaging the body of the rivet and a draw bolt slidable in said sleeve for engaging and drawing the mandrel stem of the rivet, the combination of a pneumatic piston and cylinder assembly; a hydraulic cylinder; a driven piston in said cylinder; means for connecting said driven piston to said draw bolt; another hydraulic cylinder; a driving piston in said other cylinder; means connecting said driving piston to said pneumatic piston; fluid passages connecting corresponding ends of said hydraulic cylinders to define a closed system, said hydraulic cylinders and passages being completely filled with an incompressible fluid; and means for maintaining a pressure in a part of said system greater than atmosphere.

5. A tool having a hydraulic system that absorbs shocks and is automatically self-indexing or synchronizing, comprising an actuating cylinder, an actuating piston disposed therein for exerting force principally in one direction and subject to shocks, a master cylinder, a master piston therein, means defining fluid conduits connecting each end of one cylinder with a corresponding end of the other cylinder, a resilient expansible chamber mechanism communicating with the non-pressure side of the hydraulic system, and means operating in response to the return of the master piston to a starting piston for interconnecting the pressure and non-pressure sides of the hydraulic system to permit flow of hydraulic fluid from the non-pressure side to the pressure side of the hydraulic system due to the influence of the expansible chamber.

6. A tool having a hydraulic system that absorbs shocks and is automatically self-indexing or synchronizing, comprising an actuating cylinder, a solid actuating piston disposed therein for exerting force and subject to shock, a master cylinder, a master piston disposed therein, means defining fluid conduits connecting each end of one cylinder to a corresponding end of the other cylinder, means for applying force to the master piston, a traction bar for coupling the actuating piston to a load that is substantially uni-directional so that one part of the hydraulic system is subject to a working pressure and the other side is subject to a non-working pressure, means defining a resilient expansible chamber communicating with the non-working side of the hydraulic system, and means defining a fluid passage from the expansible chamber to the master cylinder adjacent the non-working pressure end thereof but spaced from the end thereof so that it ports adjacent to the working side of the master piston, whereby leakage fluid may be retained by the expansible chamber and injected into the working pressure part of the hydraulic system, and whereby the passage may be closed by the initial movement of the master piston on its working stroke.

7. A tool having a hydraulic system that absorbs shocks and is automatically self-indexing, comprising a body member having an actuating cylinder bore formed therein, a solid actuating piston disposed therein for exerting force and that is subject to shock, a handle member fastened to the body member and having a reservoir bore therein, a sleeve disposed within the reservoir bore defining a master cylinder open at one end to the master piston disposed within the sleeve, passages formed in the head member and the handle member for connecting one end of the actuating cylinder with one end of the reservoir bore and connecting the other end of the actuating cylinder with the interior of the sleeve at the opposite end of the reservoir bore, apertures formed in the sleeve at its open end but spaced therefrom a distance approximately that of the thickness of the master piston for communicating the interior of the sleeve with the reservoir bore, and a resilient expansible chamber communicating with the reservoir bore.

HERBERT W. KUGLER.

REFERENCES CITED

The following references are of record in the file of this patent:

UNITED STATES PATENTS

| Number | Name | Date |
|---|---|---|
| 1,940,304 | Jackson | Dec. 19, 1933 |
| 2,078,209 | Sanford | Apr. 20, 1937 |
| 2,169,423 | Kessler | Aug. 15, 1939 |
| 2,173,583 | Forichon | Sept. 19, 1939 |
| 2,329,709 | Fischer | Sept. 21, 1943 |
| 2,343,278 | Cherry | Mar. 7, 1944 |
| 2,344,127 | Cherry | Mar. 14, 1944 |
| 2,380,575 | Brown | July 31, 1945 |
| 2,399,907 | Blair | May 7, 1946 |
| 2,403,262 | Colley | July 2, 1946 |
| 2,428,459 | Hollworth | Oct. 7, 1947 |

FOREIGN PATENTS

| Number | Country | Date |
|---|---|---|
| 418,221 | Great Britain | Oct. 19, 1934 |

Certificate of Correction

Patent No. 2,526,956                                                  October 24, 1950

HERBERT W. KUGLER

It is hereby certified that error appears in the printed specification of the above numbered patent requiring correction as follows:

Column 8, line 41, for "piston", second occurrence, read *position*;

and that the said Letters Patent should be read as corrected above, so that the same may conform to the record of the case in the Patent Office.

Signed and sealed this 10th day of July, A. D. 1951.

[SEAL]

ERNEST F. KLINGE,
*Assistant Commissioner of Patents.*